Aug. 6, 1957  S. F. BRADER  2,801,817
LANDING GEAR SNUBBER AND BOOSTER
Filed March 9, 1954  3 Sheets-Sheet 2
FIG. 2
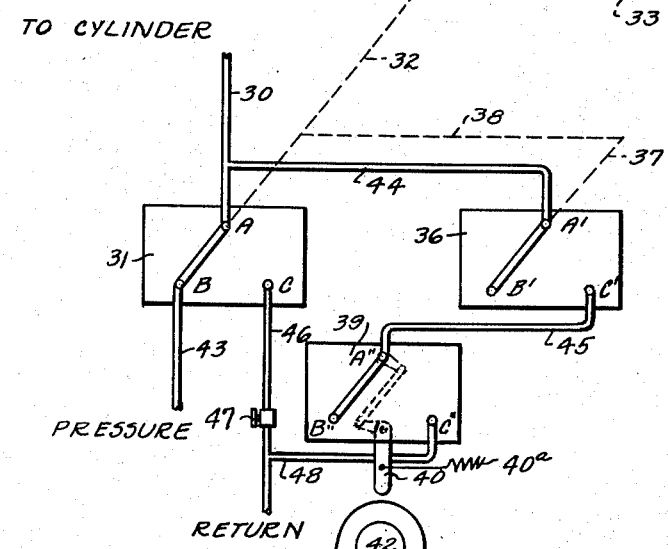
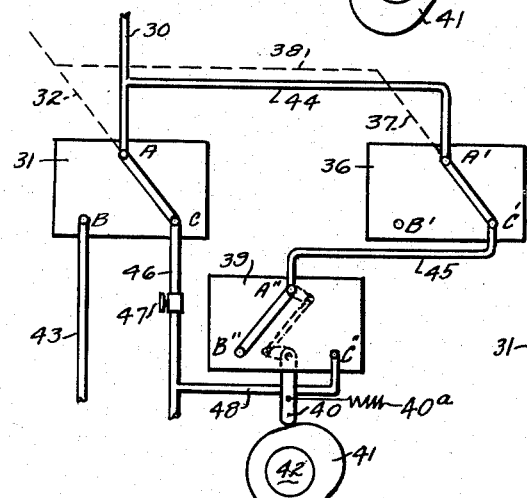
FIG. 3
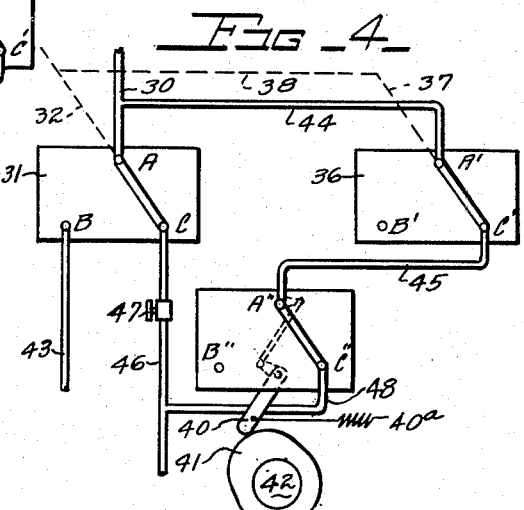
FIG. 4
INVENTOR.
STANLEY F. BRADER
BY
  Wade Koontz AND
  Charles N. Wagner
  ATTORNEYS

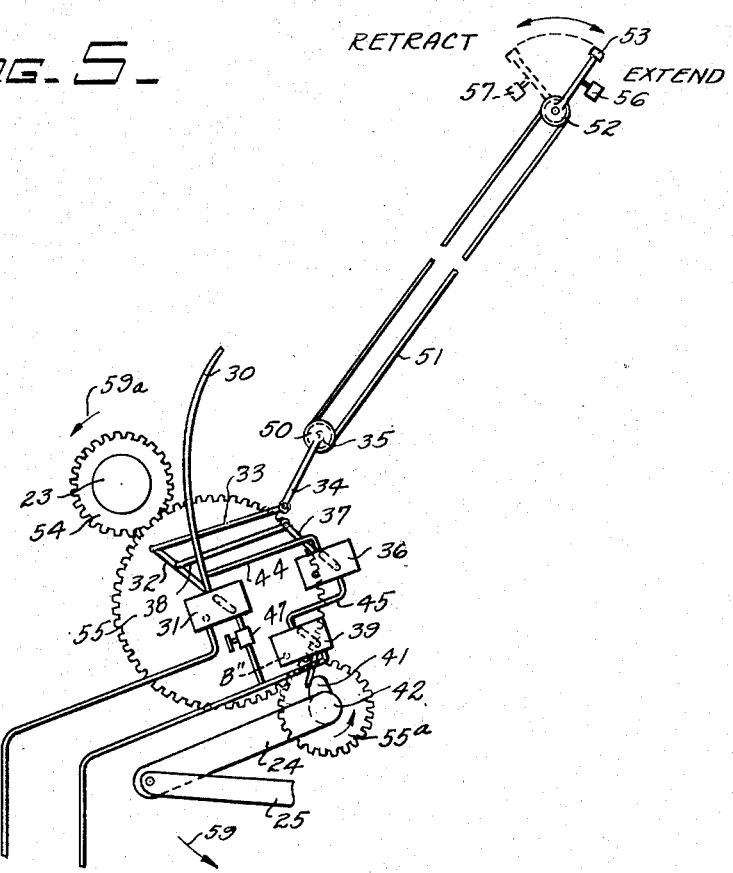

United States Patent Office 2,801,817
Patented Aug. 6, 1957

2,801,817

LANDING GEAR SNUBBER AND BOOSTER

Stanley F. Brader, Hagerstown, Md., assignor to the United States of America as represented by the Secretary of the Air Force Application March 9, 1954, Serial No. 415,184

7 Claims. (Cl. 244—102)

This invention relates to landing gear for aircraft and more particularly to retractable landing gear and includes the provision of hydraulically or fluid pressure controlled means for a vertically retractable folding landing gear, having means for assisting or boosting the movement of the gear to its retracted position, constituting fluid pressure controlled means for retarding the movement of the gear throughout a major portion of its movement toward its landing position, together with means for eliminating the retarding control thereof at a predetermined position in its movement beyond said major portion movement to permit the landing gear to move substantially free or unobstructed therefrom to its final landing position.

It is well known that a requirement for a satisfactory retractable landing gear for an aircraft includes a provision of some suitable means for the emergency extension of the gear and it is frequently the case that the weight of the gear, through the action of gravity in a retarded type of vertically movable gear, is not sufficient, by retarded free fall, to lock the gear in its extended or landing position. In large aircraft the weight of the landing gear is so great that it is usually necessary to provide some type of snubber or retarder to control the rate of descent of the gear to prevent a sudden shock on the frame structure and aircraft at the end of its downward extended movement. It is frequently the case that hydraulic cylinder and piston means are employed for this purpose in which orifices in the piston control the rate of flow of the hydraulic fluid out of the cylinder.

In some aircraft the geometry of the gear is such that the greater part of the gear extension is substantially vertical travel and the final travel may be short and substantially horizontal movement, either fore or aft. This condition is true of any gear which swings in an arc with the pivot point on the aircraft frame structure. If the snubber is allowed to act throughout the entire travel the rate of movement during final travel may not be sufficient to assure a positive locking of the gear in the extended or landing position. In this case the hydraulic snubbers may have fluted walls to allow a fast rate of flow of the hydraulic fluid past the piston to allow the gear to swing faster into its locked landing position.

The present invention discloses a means whereby a landing gear requiring snubbing means may have a hydraulic cylinder and piston type of extensible retractable snubber which also acts as a hydraulic booster to assist in retracting the gear. While this snubber and booster arrangement may be used on aircraft having heavy wheeled type landing gear it is especially useful when such aircraft are converted to the less common endless track type landing gear, or to a ski gear, both of which are usually much heavier than the original wheel gear and, therefore, require greater power for lifting into retracted position.

An object of the invention therefore is the provision, in a landing gear of the type just described, a fluid pressure controlled booster-snubber device between the landing gear and the aircraft, including valve control means for admitting fluid pressure into the device during upward or retracting movement of the gear, and retarding the outflow of fluid from the device during a material downward movement of the landing gear toward its landing position, including venting means operable during the remaining downward movement of the landing gear to its landing position to permit the gear to move less retarded or free from a predetermined position in its downward movement to its final extended landing position.

A further object includes means operable by the landing gear during its downward movement toward its extended landing position for venting the booster-retarder device to reduce the retarding effect thereof on the landing gear thereafter to its final extended landing position.

A further object includes means connected to the landing gear during retracting movement thereof for connecting the booster-retarder device to a source of fluid pressure to assist or boost the landing gear during its upward movement to its retracted position.

A further object includes a pressure supply conduit, a restricted pressure outlet conduit and a fluid pressure venting passage, and means operable by the landing gear for connecting the pressure supply conduit to booster-retarder device during upward movement of the landing gear toward its retracted position and interrupting said connection and connecting the booster-retarder device to said restricted pressure outlet during initial movement of the landing gear from its retracted position toward its landing position, and connecting said booster-retarder to said venting passage from a predetermined point in its movement toward said landing position to said landing position.

Other objects and advantages of the invention will become apparent from the following description taken in connection with the accompanying drawings in which like reference characters refer to like parts in the several figures.

*Drawings*

Figure 2 is a detail diagrammatic view of the valve arrangement, showing the valves in landing gear boosting retracting position.

Figure 3 is a view similar to Figure 2, showing the valves in landing gear retarded lowering position.

Figure 4 is a similar view with the valves moved to the venting position, permitting movement of the landing gear unrestrained to its landing-locked position.

Figure 5 is enlarged detail of valve actuating arrangement.

Figure 1:
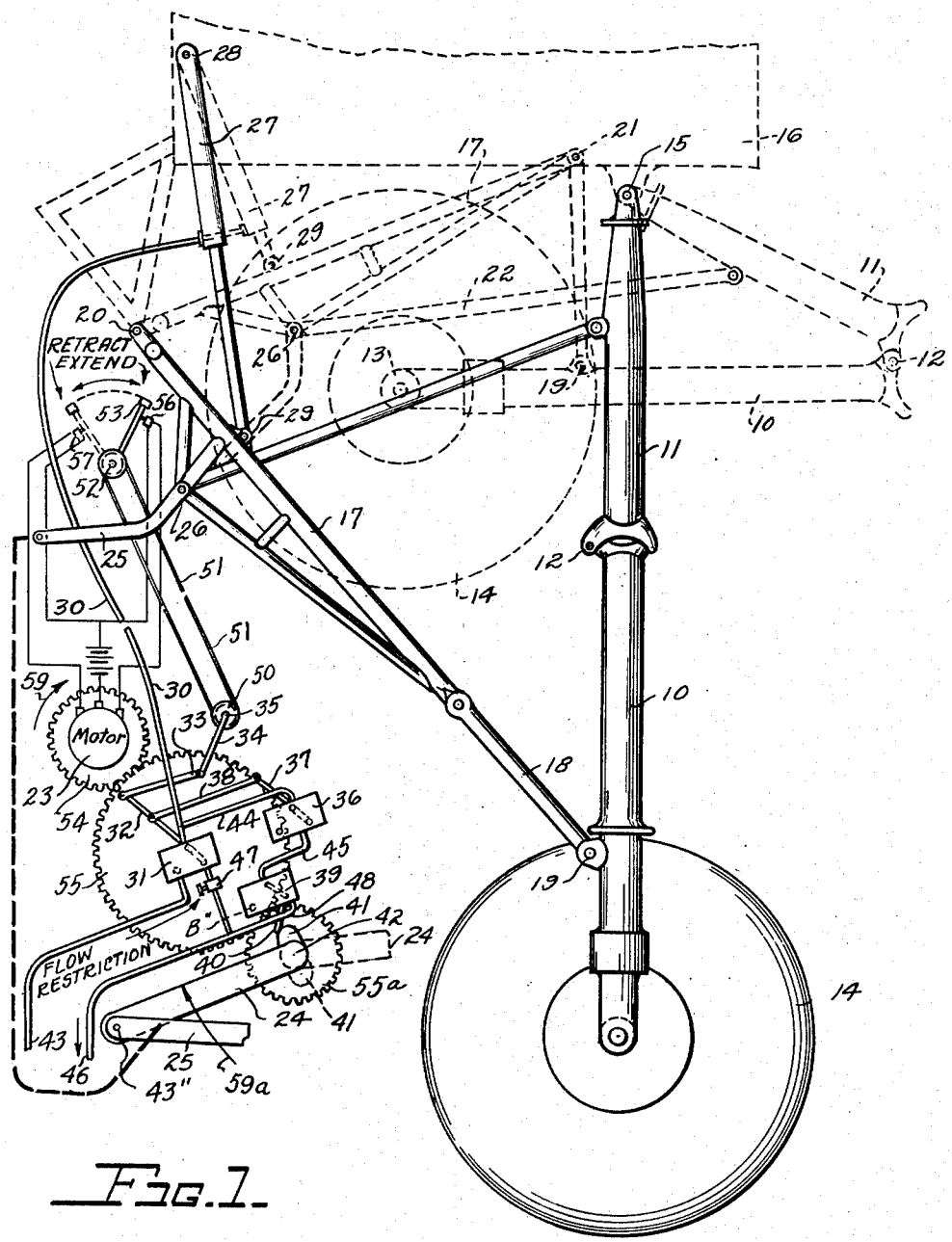
Figure 1 is a diagrammatic side elevation of a landing gear structure having my invention incorporated therein. The landing gear being shown in full lines in extended or landing position and in elevated or retracted position in dotted lines.

Referring first to Figure 1, illustrating a retractable landing gear somewhat diagrammatically, comprising a two part main cushion or shock strut 10 and 11 pivoted for breaking or folding about the point or pivot 12. The lower part includes a cushion plunger and axle 13 on which is journalled the ground, or aircraft support engage member 14, such as a landing wheel, for which may be substituted an endless track gear (not shown), or a ski-gear (not shown). The upper part 11 of the strut is attached at point 15 to hinge or pivot on the landing gear receiving structure support of the aircraft, indicated generally at 16. A two part drag-link comprising the upper part or lever 17, and a lower part or link 18 is pivotally connected at 19 to the lower strut part 10, pivoted at the upper end of the upper part 17 to the main support 16 at 20, the drag link being pivotally connected together at 21 for "breaking" or folding. A main strut "breaking" link 22 pivotally connects the upper main part 11 to the drag link member 17 to assist in causing the main strut to "break" or fold at the hinge 12 and begin the retraction of the landing gear toward its retracted position as shown substantially in dotted lines in Figure 1.

An actuator unit 23 preferably power driven, drives or rotates a crank 24, through a gear train 54, 55 and 55a, the crank 24 being connected to a link 25, pivoted at its other end at 26 to a hinged brace strut part 17 to retract the landing gear.

A hydraulic or fluid pressure controlled extensible retractable booster snubber device 27 is provided, pivoted at one end at 28 to the support 16 and at its other end at 29 to the brace strut link part 17.

A pressure fluid delivery conduit 30 connects the outer or lower end of the booster-snubber cylinder to a control valve mechanism, more clearly disclosed in Figures 2, 3 and 4, for delivering a fluid pressure into the booster-retarder 27 to extend the same, and controlling the discharge of fluid from the cylinder during its contraction to control the movement of the landing gear from retracted to extended positions. Suitable releasable locking means (not shown) may be provided for automatically locking the landing gear parts in their extended landing position, shown in full lines in Figure 1.

Figures 2, 3 and 4 show my improved control valve arrangement, which is shown also very diagrammatically in Figure 1.

The valve arrangement comprises a first two way valve 31 with a port A connected to an inlet-outlet conduit 30 connected to and extending from the booster-retarder cylinder 27. A left hand lower port B is connected to a fluid pressure supply conduit 43 under a suitable fluid pressure while a right hand lower exhaust port C is connected to a restricted discharge conduit 46 having a flow rate control restriction 47 therein, preferably adjustable. Shifting the control valve 31 to its "elevating" position connects the ports A and B to deliver pressure fluid into the booster-snubber cylinder device 27 to contract the same which assists or "boosts" the landing gear toward its retracted position, while shifting of the valve 31 to landing gear extending or "retarding" positions connects the port A with port C to discharge the pressure fluid from the cylinder 27 through conduits 30 and 46 past the flow retarding restriction 47 permitting downwardly retarded movement of the landing gear from the retracted position toward its extended or landing position. The fluid discharged through conduit 46 may be returned, in a well known manner to the sump or fluid pressure supply apparatus at the lower end of the conduit 46.

A second or venting control valve is provided, as indicated at 36, having a fluid inlet port A' connected by a conduit 44 to the conduit 30 between the control valve device 31 and the booster-retarder cylinder device 27, the venting control valve 36 having a closed port B' and a discharge or vent port C' connected by a venting discharge conduit or passage 45 to the inlet A" of a third or two way valve 39, this valve having a closed port B" and a substantially unobstructed venting passage 48 connected to the port C" of the valve 39 which connects the conduit 46 at a point between flow restriction 47 and its outer, or return, or sump end, thus by-passing the return of the pressure fluid around the flow restriction 47 and permitting a substantially unobstructed fluid discharge from the retarder cylinder 27, when the valves 31, 36 and 39 are in the position as shown in Figure 4.

The valve 39 is provided with means for normally maintaining the same in its closed position as shown in Figures 2 and 3, such as a spring 40a, and is provided with a cam operated actuating lever arm 40 actuated by a cam 41 on shaft 42 for shifting the valve 39 to its open position, as shown in Fig. 4. The relationships between crank 24, shaft 42, arm 40 and cam 41 are shown also in Figure 1.

The valves 31 and 36 are provided with actuating arms 32 and 37 respectively, connected together by a link 38 for simultaneous movement between the position shown in Figure 2 and the position shown in Figures 3 and 4, the arm 32 being longer than arm 37 is connected by a link 33 that is connected to a crank arm 34, securely attached to a sprocket wheel 50 mounted for rotation on a shaft 35. This linkage is mechanically moved to shift the valves automatically upon actuation of the control means used to energize the power means to extend or retract the landing gear as will be more fully described herein.

The power control lever 53 through chain 51, sprockets 52 and 50 shifts the crank arm 34, moving the valves 31 and 36 to the positions shown in Figure 2 when the landing gear is elevated from its landing position shown in full lines in Figure 1 toward its retracted position as shown in dotted lines in Figure 1.

Fluid under a material pressure passes from conduit 43 through the valve ports B—A of valve 31 into the outer end of the booster cylinder 27 through the conduit 30, the venting passage 44 being closed by the valve 36 at this time thus interrupting the by-pass of the pressure fluid through the discharge conduit 44. As the landing gear elevates the cam member 41 is rotated out of engagement with the actuating lever 40, allowing the lever 40 and valve 39 to return to closed position, shown in Figures 2 and 3, shutting off the free venting passage 44, 45 and 48. Fluid under pressure now passes through the conduits 43 and 30, contracting the booster-retarder extensible member 27, which assists or boosts the elevating movement of the landing gear member to its retracted position shown in Figure 1 in dotted lines.

Manipulation of the control lever 53 to "extend" position causes the energizing of the power means to effect rotation of the crank 24 from the position shown in dotted lines in Figure 1 toward the full line position and the control lever 53 initially shifts the crank 34, and through connected links 33 and 38 and levers 32 and 37, shifts the valves 31 and 36 to positions shown in Figure 3, valve 31 establishing a discharge communication from the booster-retarder cylinder 27 through ports A and C to conduit 46, the restriction 47 therein retarding the discharge from the booster-retarder device which consequently retards the downward movement of the landing gear throughout a major portion of its extension. Retarded downward movement of the landing member 10—11—14 continues until the valve 39 is shifted since this valve 39 being closed blocks a by-pass of the fluid discharged from the booster-retarder cylinder 27 around the flow restriction 47. The landing strut continues to descend, under gravity in a controlled retarded manner with the cam member 41 being rotated by the landing gear through link 25 toward the free end of the actuating lever 40 for the third or venting valve 39, and at some predetermined material point in the downward travel of the landing gear the cam member 41 is moved to the position shown in Figure 3 where the cam 41 begins to engage and moves the lever 40 to open the valve 39. Further downward movement of the landing gear actuates the lever 40, and through the connected link opens the valve 39, by-passing the discharged pressure fluid, or a material position of it, around the flow restriction 47 and through conduit 44, valve ports A' and C' of valve 36, and through conduit 45, ports A" and C" of valve 39 and out conduit 48 to the conduit 46 at a point beyond the restriction 47. The landing strut is now thus free to gravitate from this point to its fully extended position and with sufficient acceleration to move down into locking engagement without a material resistance to said movement so that it will be locked automatically by any conventional latch means (not shown).

In very heavy landing gear, such as that employed on large planes or where endless track ground engaging members or "skis" are employed, my arrangement provides fluid control retarder means having valve means therein for rendering the retarding means automatically non-operative at some point in the extension of the landing gear and utilizes the same retarding means as a booster for boosting the landing gear to its retracted position by fluid pressure.

As set forth above the valve means is arranged to be shifted automatically upon actuation of the control used for energizing the power means for controlling the lowering of the landing gear. One form that might be employed for shifting the valve means to the positions shown in Figures 2, 3 and 4 is disclosed in Figure 5. The crank arm 34 is connected at point 35 to sprocket wheel 50 which engages an endless chain 51. This chain 51 extends into the pilot's cockpit in the main aircraft structure and engages a second sprocket wheel 52 operated by the control lever 53, provided within easy reach of the pilot to control the retraction and extension of the landing gear. An electrical switch 56 is provided for actuation by the hand lever 53 when it is in the most rearward or "extend" position. A second electrical switch 57 is positioned for actuation by the hand lever 53 when it is moved to he most forward or "retract" position.

Movement of the hand lever 53 by the pilot from the "extend" position to the "retract" position causes the hand lever to strike the switch 57 which closes the circuit to the power means or electric motor actuator 23. As the actuator 23 rotates it turns its drive gear 54 in the direction of the arrow 59a, through the gear train 55, 55a, rotates the crank 24 in the direction of arrow 59 which, through the link 24, causes the hinged brace strut 17 to "break" at its hinge point 21 and force the landing gear into its retracted position shown by dotted lines in Fig. 1. At the same time hand lever 53 is being moved forward to the "retract" position it rotates the sprocket 52 which, through endless chain 51, rotates sprocket 50 and crank arm 34 to shift valve 31 and 36 by means of linkage 32, 33, 37, 38 to the positions shown in Fig. 2. This shifting of the valve gear to position where pressure from conduit 30 is admitted into the lower end of booster cylinder 27 through valve 31 and valve 36 cuts off any flow into valve 39, the piston in cylinder 27 assists in raising the landing gear to its retracted position.

When it is desired to extend the landing gear the hand lever 53 is moved rearwardly to the "extend" position where it strikes switch 56 to close the reverse circuit to the electric motor actuator 23 for driving it in the reverse direction to lower or extend the landing gear to its extended or landing position shown in solid lines of Fig. 1 through the linkage mechanism previously described. When the hand lever 53 is moved rearwardly it rotates the sprocket wheel 50 and its arm 34 in the opposite or clockwise direction to shift the valves 31 and 36 to the position of Figures 1, 3, 4 and 5. Pressure fluid to the booster-retarder cylinder is cut off by valve 31 and is discharged thereby through the discharge conduit 48 past the flow restriction 47 causing the booster to retard the downward movement of the landing gear to keep it within safe limits depending upon the area of the flow restriction 47.

It should be mentioned that in the initial downward movement of the landing gear the cam 41 moves out of the way of the lever 40 some means, such as a spring 40a, resets the valve 39 to position shown in Fig. 3 preventing fluid discharge from pipe 44 through valve 36 and pipes 45 and valve 39 and 48 to by-pass the flow restriction 47 (see Figure 3). At some predetermined point in the landing gear extending movement the cam 41 engages the actuating lever of valve 39 to shift the valve to the position shown in Figures 4 and 5 thus by-passing the flow restriction 47 through pipes 45 and 48 and valve 39 thus permitting the landing gear to gravitate freely the rest of the way to its fully extended or landing position, bringing the parts to the position shown in Figures 1, 4 and 5, the gear being locked in this latter position by any suitable locking means, not shown.

While one particular embodiment of my invention has been disclosed and described it is understood that the invention is not to be restricted thereto, and all modifications are intended to be covered which would be apparent to one skilled in the art, and which come within the scope of the appended claims.

What is claimed is:

1. In a retractable landing gear, a support, a landing gear member movable on said support between an elevated retracted position and a lower landing position, retracting means connected between said support and said member to move said member between said landing and said retracted positions, fluid pressure actuated booster-retarder means operable between said support and said retracting means, fluid pressure supply and discharge conduit means connected for supplying fluid pressure to said booster-retarder means including valve means therein having a booster position establishing communication between the fluid pressure supply conduit means and the booster-retarder means for boosting the retracting means to move said member to said retracted position and movable to a retarding position for retarding the flow of the fluid pressure from said booster-retarder means to retard the movement of said retracting means and said member toward said landing position, an actuating connection between said valve means and said retracting means for moving said valve means to said booster position incident to the movement of the retracting means to move the said member toward said retracted position and moving the valve means to said retarding position incident to the movement of said member from said retracted position toward said landing position, venting control valve means in said conduit means having a normally closed non-venting position and movable to a venting position to vent said booster means to relieve the retarding effect thereof during movement of said retracting means and said member to said landing position, and actuating means operated by said retracting means for moving said venting valve means to venting position during a material latter portion of the movement of said retracting means and said landing gear member toward said landing position.

2. In a retractable landing gear structure for aircraft, a support, a sectional folding landing member pivoted to the said support for swinging movement in a substantially vertical plane from an upper retracted position to a lower extended landing position, said landing member including a ground engaging support at its lower end, said sectional folding landing member being hinged together intermediate the last mentioned support and its pivot to the first mentioned support to fold in said substantially vertical plane to move the ground engaging support substantially vertically upward during the folding thereof from the said extended to said retracted positions, an inclined foldable brace strut connected at its upper end to the first mentioned support and at its lower end to said sectional folding landing member below its hinged connection, an actuating link member pivotally connected at one end to said brace strut between its folding pivot and its pivotal connection on first mentioned support and at its other end to said landing member between its hinged connection and its connection to the first mentioned support, an operating crank member, a link connected between the crank member and the brace strut adjacent said link connection thereto, an extensible retractable fluid pressure controlled booster-retarder cylinder and piston member connected at one end to said first support in spaced relation to said landing member and said brace strut member pivotal connection to said first support, and connected at its other end to said brace-strut member adjacent said actuating link connection thereto, whereby rotation of the crank member from the position where the landing member is in landing position swings and folds the brace member, to move the said link member to swing and fold said landing member into said elevated retracted position, and rotation of said crank member from the position where the landing member is in elevated retracted position permits said link connected strut and landing members to unfold and straighten during movement of said landing member to said landing position, pressure fluid conduit means connected to the interior of the extensible booster retarder member, a first control valve means in said conduit means movable to a booster position to establish pressure communication between said pressure fluid supply conduit means and said booster-retarder cylinder for extension thereof to boost the brace strut and landing gear member to their folded retracted position, said valve means having a second position for interrupting fluid communication between said booster-retarder cylinder and said pressure supply conduit, and establishing restricted fluid communication out of said extensible booster-retarder cylinder to retard the contraction of the said booster-retarder cylinder piston member, valve actuating means between said crank member and said valve member for shifting the first control valve means to said booster position incident to predetermined movement of the crank means to move the landing gear member to said retracted position and movable to said second position incident to movement of the crank member in moving the landing gear member from said retracted position toward said landing position, venting control valve means connected in said pressure fluid conduit means having a normally closed position and an open venting position for venting the pressure fluid conduit means to relieve pressure in said booster-retarder cylinder to remove retarding control thereof from the landing gear member, and valve actuating means operable by said crank means during a predetermined degree of movement thereof in lowering said landing gear member from a predetermined partially lowered position to said completely lowered landing position, to move said last control valve means to said venting position, whereby said extensible landing gear is retarded by said booster-retarder cylinder during a major first portion of its extending position movement and permitted to descend freely and less retarded during the balance of said downward movement to its fully extended position.

3. In a retractable landing gear, a support, a landing gear member hinged to the support for swinging movements between and elevated retracted position and a lower extended landing position, crank means carried by the support for raising the said member from said landing position to said retracted position, and permitting movement thereof from said retracted position to said landing position by gravity, a fluid controlled extensible chamber booster-retarder link member connected between said landing gear member and said support for extension during the movement of said landing gear member to said landing position and for retraction during the movement of said landing gear member to said retracted position, conduit means connected to said chamber for supplying a pressure fluid to and exhausting the pressure fluid from said chamber, valve means in said conduit means movable to a boosting position for admitting pressure fluid to said conduit means to extend said link member to boost the landing gear member toward said retracted position and movable to a lowering position to discharge the pressure fluid from the chamber fluid, retarding means in said conduit means for restricting the rate of fluid discharge from said chamber, during movement of said landing gear member from said retracted position to said landing position, means for moving said valve means to said first position during movement of the landing gear member from said landing position toward the retracted position, and means actuated by said landing gear member for venting the chamber to by-pass said retarding means during the movement of said landing member to its landing position and before the same has reached its landing position.

4. In an aircraft retractable and extensible landing gear structure, a support, a landing gear member movably connected to said support for movements between extended landing position and a retracted flight position, an extensible fluid pressure operated booster and retarder device connected between said support and said landing gear member for boosting the movement of said landing gear member to a retracted flight position and retarding movement thereof from retracted position toward a landing position, conduit means connected to said booster and retarder device said conduit means including means for supplying a fluid under pressure to said booster and retarder device for retraction thereof to boost the movement of the said landing gear member to said retracted position, flow retarding means in said conduit means for retarding the flow of pressure fluid from said booster and retarder device during a major portion of the extension thereof during movement of said landing gear member toward said landing position, control valve means in said conduit means movable to a booster position to admit pressure fluid to said booster and retarder device and movable to a retarder position to discharge pressure fluid from said booster and retarder device through said flow retarding means to retard the movement of said landing gear member from said retracted position toward said extended landing position, a venting valve in said conduit means for bypassing said flow retarding means having a closed position and having an open position for relieving pressure in said booster and retarder device during the latter portion of the movement of said landing gear member toward landing position, means operated by said landing gear during the final portion of the movement of said landing gear from its retracted position to said landing position for opening said venting valve means, said landing gear member being pivoted to said support for substantially vertical swinging movements between said elevated retracted position and said lower extended landing position, crank means connected to said landing gear member for raising said landing gear member and controlling the lowering of said landing gear member from said retracted position to said extended landing position, crank operating control means connected for operating said crank means between said landing and retracted positions, and means operated by said crank operating control means and connected to said control valve means in said conduit means for moving said control valve means to admit pressure fluid into said booster and retarder to contract said booster and retarder by movement of said crank operating control means in one direction to actuate said crank means to elevate said landing gear to retracted position and movable to a second position for moving said control valve to vent said booster retarder through said conduit means and flow retarding means to control movement of said landing gear member toward said landing position.

5. In a retractable landing gear for aircraft, a support, a landing strut member connected to said support for vertical movements between an extended landing position and a retracted position substantially above said landing position, landing strut actuating means connected between said support and said landing strut member for moving said landing strut member from said landing position to said retracted position, an extensible fluid operated cylinder and piston link member connected between said strut member and said support and movable from a contracted position when said landing strut member is in retracted position to an extended position by movement of said landing strut member to said landing position, conduit means connected to said link member for admitting pressure fluid to said link member, said conduit means having a discharge portion for discharging pressure fluid from said link member, a flow restriction in the discharge portion of said conduit means, first valve means in said conduit means shiftable to a first position for admitting fluid pressure to said extensible link member for contraction thereof for urging said landing strut member to said retracted position, said first valve means being shiftable to a second position for discharging pressure fluid from said link means through said flow restriction during movement of said strut member toward said landing position, a second valve means in said conduit means having a venting outlet and an inlet connected intermediate said first valve means and said extensible link member and shiftable to a closed position and a venting position, a third valve means in said conduit means having a venting outlet and an inlet connected to the venting outlet of said second valve means and having a closed position and a venting position, a venting conduit connected between the third valve venting outlet and said first valve discharge conduit, downstream below said flow restriction, shiftable control means connected for actuating said landing strut actuating means to elevate said landing strut member to said retracted position and lower the same to said landing position, valve actuating means connected between said shiftable control means and said first and second valve means for moving said first and second valve means to their respective first and closed positions during movement of said control means to elevate said landing strut to said retracted position, and for shifting said first and second valve means to their venting positions during movement of said control means to lower said landing strut member to said landing position, resilient means normally holding said third valve means in closed position and means actuated by said landing strut actuating means throughout a final movement of said landing strut toward its extended landing position for moving said third valve to its venting position to vent said extensible link member through said venting conduit to bypass said flow restriction in said discharge portion of said conduit means from said first valve means, to allow substantially free movement of said landing strut to its final or landing position.

6. Apparatus as claimed in claim 5 in which said means actuated by said landing strut actuating means for moving said third valve to its venting position comprises cam means operable by said landing strut actuating means for engaging and camming said third valve means to open position during the final portion of the movement of said landing strut actuating means and said landing strut member to its landing position.

7. In an aircraft landing gear, a support, landing gear means movably mounted on said support for vertical movements between an elevated retracted position and a lower landing position, power means on the support connected to the landing gear means for moving the landing gear means from said landing position to said retracted position and controlling the movement of said landing gear means from said retracted position toward said landing position, shiftable power control means for actuating said power means, fluid pressure controlled snubber and booster means comprising an extensible contractable cylinder and piston link member connected at one end to the support and at the other end to the landing gear means, a pressure fluid conduit connected to the cylinder of said link member for admitting pressure fluid into said cylinder to contract said link member to boost the landing gear means to said retracted position and for discharging the pressure fluid from said cylinder during extension of said link member to snub the movement of the landing gear means from the retracted position toward said landing position, a first two-way valve having a pressure fluid delivery port connected to said pressure fluid conduit, an inlet port connected to a fluid pressure supply source, said two-way valve having a discharge outlet port, a discharge conduit connected to said discharge outlet port, a flow restriction in said discharge conduit for retarding the flow therethrough from said booster-snubber cylinder, a second valve having an inlet port connected in communication with the said pressure fluid conduit to the booster retarder cylinder and a discharge port, a third valve having an inlet port connected to the last mentioned discharge port and having an outlet port, conduit means connecting the last mentioned outlet port to said discharge conduit downstream from said flow restriction therein, actuating linkage connected between said first valve means and second valve and said power control means for actuating said power means and simultaneously shifting said first valve means and second valve to establish communication through the first two-way valve between the pressure inlet port and the booster retarder cylinder for introducing pressure fluid into said cylinder during movement of the landing gear means toward retracted position to boost the lifting movement thereof, and actuating said power means and simultaneously shifting the said first two-way valve means and second valve to interrupt the supply of pressure fluid through the pressure inlet port to the booster-retarder cylinder and establish communication between said booster-retarder cylinder and the discharge condiut upstream of the flow restriction therein during the movement of the landing gear means from the retracted position toward the extended landing position, resilient means normally maintaining said third valve in closed position, cam means operable by said power means during movement of the landing gear means by said power means for engaging said third valve means at a predetermined position during the movement of the landing gear means toward landing position for shifting said third valve to establish fluid communication between said booster-retarder cylinder and the discharge conduit downstream from said flow restriction therein to by-pass the fluid from said booster-retarder cylinder around said flow restriction during movement of the landing gear means into its fully extended landing position.

References Cited in the file of this patent

UNITED STATES PATENTS

| | | |
|---|---|---|
| 1,940,836 | Ayer | Dec. 26, 1933 |
| 2,186,235 | Brown | Jan. 9, 1940 |
| 2,244,894 | Parker | June 10, 1941 |
| 2,331,108 | De Ganahl | Oct. 5, 1943 |
| 2,336,794 | Levy | Dec. 14, 1943 |
| 2,367,682 | Kehle | Jan. 23, 1945 |
| 2,377,115 | Van Der Werff | May 29, 1945 |
| 2,552,843 | Clifton et al. | May 15, 1951 |

FOREIGN PATENTS

| | | |
|---|---|---|
| 480,674 | Great Britain | Feb. 28, 1938 |